(12) United States Patent
Lo

(10) Patent No.: US 9,411,190 B1
(45) Date of Patent: Aug. 9, 2016

(54) LIQUID CRYSTAL DISPLAY WITH SEPARATED POLARIZER DEVICE

(71) Applicant: LITEMAX ELECTRONICS, INC., New Taipei (TW)

(72) Inventor: Jung-Chi Lo, New Taipei (TW)

(73) Assignee: LITEMAX ELECTRONICS INC. (TW)

( * ) Notice: Subject to any disclaimer, the term of this patent is extended or adjusted under 35 U.S.C. 154(b) by 2 days.

(21) Appl. No.: 14/616,958

(22) Filed: Feb. 9, 2015

(51) Int. Cl.
*G02F 1/1335* (2006.01)
*G02F 1/1333* (2006.01)

(52) U.S. Cl.
CPC .... *G02F 1/133528* (2013.01); *G02F 1/133308* (2013.01); *G02F 1/133606* (2013.01)

(58) Field of Classification Search
CPC .................................................. G02F 1/133606
See application file for complete search history.

(56) References Cited

U.S. PATENT DOCUMENTS 6,590,605 B1 * 7/2003 Eichenlaub ........ H04N 13/0409
348/42

* cited by examiner

*Primary Examiner* — Timothy L Rude
(74) *Attorney, Agent, or Firm* — Schmeiser, Olsen & Watts, LLP

(57) ABSTRACT

A liquid crystal display with separated polarizer device comprises a frame; a backlight module, deposited in the frame; a liquid crystal panel, deposited in the frame and separated from the backlight module; a transparent substrate, deposited in the frame and separated from the liquid crystal panel; a first polarizer device, deposited on a surface of the backlight module facing the liquid crystal panel; and a second polarizer device, deposited on a surface of the transparent substrate facing the liquid crystal panel; therefore, reworking of the liquid crystal display is facilitated.

9 Claims, 3 Drawing Sheets

LIQUID CRYSTAL DISPLAY WITH SEPARATED POLARIZER DEVICE

FIELD OF TECHNOLOGY

The invention relates to a liquid crystal display, and more particularly, to a liquid crystal display with separated polarizer device that facilitates reworking and has high process yield when curved.

BACKGROUND

In conventional liquid crystal displays, polarizer devices are directly adhered to liquid crystal panels; therefore, when the liquid crystal display undergoes reworking, not only is it time-consuming but the user might also damage the liquid crystal panel.

In addition, when manufacturing curved liquid crystal displays, liquid crystal panels with adhered polarizer devices are required to be bent; however, the polarizer device constrains the glass in the liquid crystal panel and thus when bent, the smaller the radius of curvature of the liquid crystal panel, the larger the curvature, and the easier the glass in the liquid crystal panel may fracture due to curvature, which results in decrease in process yield and increase in manufacture costs.

Therefore, the development of a liquid crystal display that facilitates reworking and bending so as to increase reworking efficiency and process yield shall be disclosed in the present invention.

SUMMARY

To solve the above issues of prior art, a purpose of the present invention is to provide a liquid crystal display with separated polarizer device that facilitates reworking.

Another purpose of the present invention is to provide a liquid crystal display with separated polarizer device that has high process yield when curved.

To achieve the above and other purposes, the present invention provides a liquid crystal display with separated polarizer device, comprising: a frame; a backlight module, deposited in the frame; a liquid crystal panel, deposited in the frame and separated from the backlight module; a transparent substrate, deposited in the frame and separated from the liquid crystal panel; a first polarizer device, deposited on a surface of the backlight module facing the liquid crystal panel; and a second polarizer device, deposited on a surface of the transparent substrate facing the liquid crystal panel.

In the liquid crystal display with separated polarizer device, the material of the transparent substrate is glass or polymethylmethacrylate (PMMA).

In the liquid crystal display with separated polarizer device, the backlight module, the liquid crystal panel, the transparent substrate, the first polarizer device, and the second polarizer device are curved.

In the liquid crystal display with separated polarizer device, the distance between the liquid crystal panel and the backlight module is between 0.1 mm and 50 mm; preferably, the distance between the liquid crystal panel and the backlight module is between 0.1 mm and 10 mm.

In the liquid crystal display with separated polarizer device, the distance between the liquid crystal panel and the transparent substrate is between 0.1 mm and 50 mm; preferably, the distance between the liquid crystal panel and the transparent substrate is between 0.1 mm and 10 mm.

In summary, the liquid crystal display with separated polarizer device of the present invention facilitates reworking so as to increase reworking efficiency by the above separated arrangement; in addition, the glass in the liquid crystal panel is effectively prevented from being fractured when bent so as to increase process yield.

BRIEF DESCRIPTION

DETAILED DESCRIPTION

The purposes, features, and effects of the invention may be more fully understood by the subsequent detailed description and embodiments with references made to the accompanying drawings.

Figure 1:
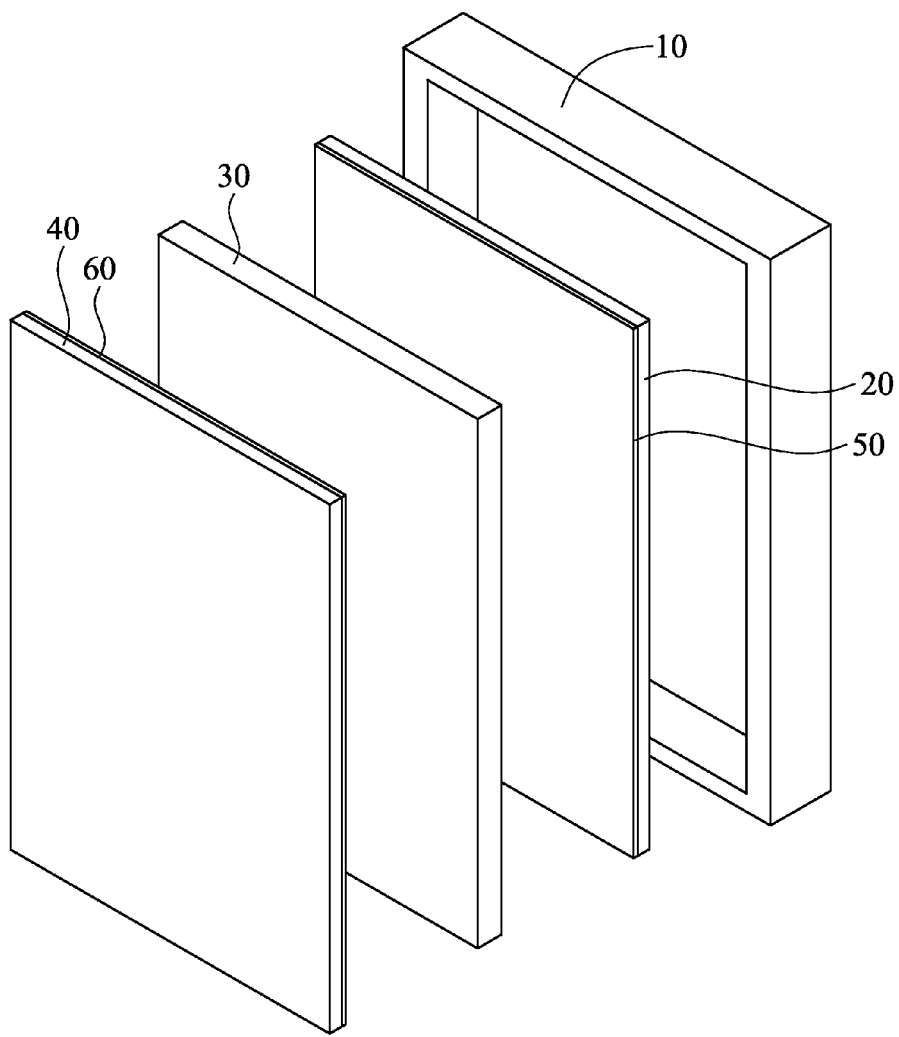
FIG. 1 is an exploded diagram of a liquid crystal display with separated polarizer device of a first embodiment of the invention.
Figure 2:
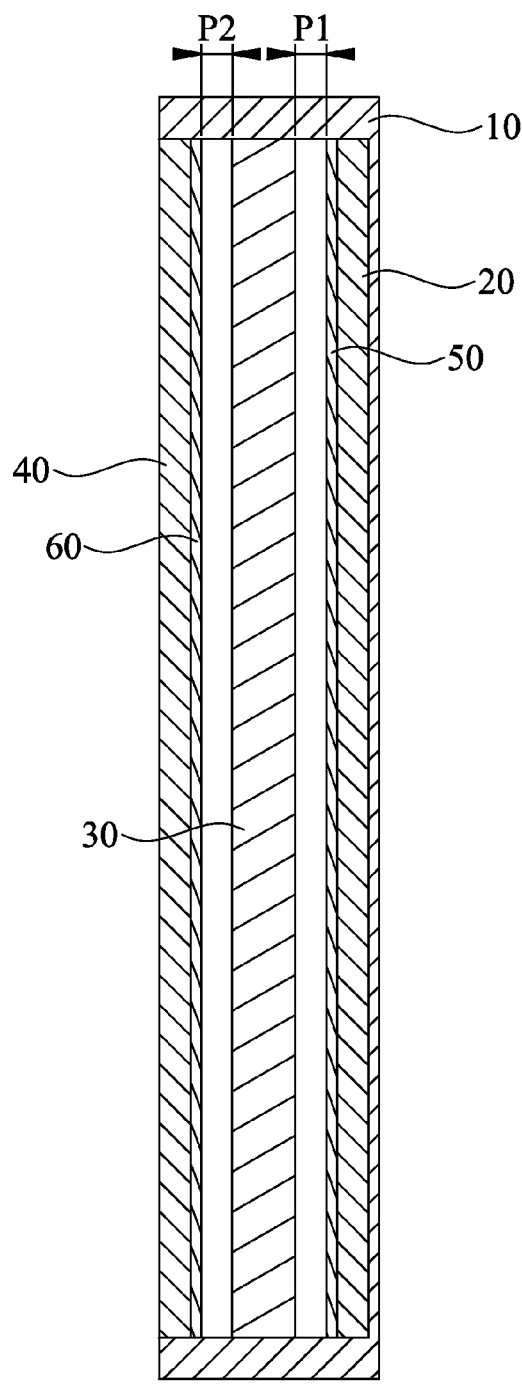
FIG. 2 is a cross-sectional diagram of the liquid crystal display with separated polarizer device of the first embodiment of the invention.

FIG. 1 and FIG. 2 show a first embodiment of a liquid crystal display 100 with separated polarizer device of the invention. The liquid crystal display 100 comprises a frame 10, a backlight module 20, a liquid crystal panel 30, a transparent substrate 40, a first polarizer device 50, and a second polarizer device 60.

The backlight module 20 is deposited in the frame 10; the liquid crystal panel 30 is deposited in the frame 10 and is separated from the backlight module 20 by a distance P1. Although not shown, it is understood that the liquid crystal panel 30 is similar with conventional liquid crystal panels and comprises a color filter (CF) substrate, a thin-film transistor (TFT) substrate, a liquid crystal layer, a glass substrate, etc. The distance P1 is between 0.1 mm and 50 mm, and preferably between 0.1 mm and 10 mm; the distance P1 influences the display effect of the liquid crystal display 100. The smaller the distance P1, the more the saved internal space of the liquid crystal display 100; in addition, when the distance P1 exceeds 50 mm, the liquid crystal display 100 may still be used but the display effect of the liquid crystal display 100 may be blurred.

The transparent substrate 40 is deposited in the frame 10 and is separated from the liquid crystal panel 30 by a distance P2. The material of the transparent substrate is transparent material such as glass, polymethylmethacrylate (PMMA), etc. The distance P2 is between 0.1 mm and 50 mm, and preferably between 0.1 mm and 10 mm; the distance P2 influences the display effect of the liquid crystal display 100. The smaller the distance P2, the more the saved internal space of the liquid crystal display 100. Furthermore, the distance P1 and the distance P2 may be adjusted according to requirements and do not have to be exactly the same; in addition, when the distance P2 exceeds 50 mm, the liquid crystal display 100 may still be used but the display effect of the liquid crystal display 100 may be blurred.

The first polarizer device 50 is deposited on a surface of the backlight module 20 facing the liquid crystal panel 30; the second polarizer device 60 is deposited on a surface of the transparent substrate 40 facing the liquid crystal panel 30.

Therefore, as the first polarizer device 50 and the second polarizer device 60 are separately deposited on the backlight module 20 and the transparent substrate 40, when reworking the liquid crystal display 100, the liquid crystal panel 30 does not have to be processed to rapidly remove and replace the first polarizer device 50 and the second polarizer device 60; as a result, reworking efficiency may be increased and the liquid crystal panel 30 may not be damaged.

Figure 3:
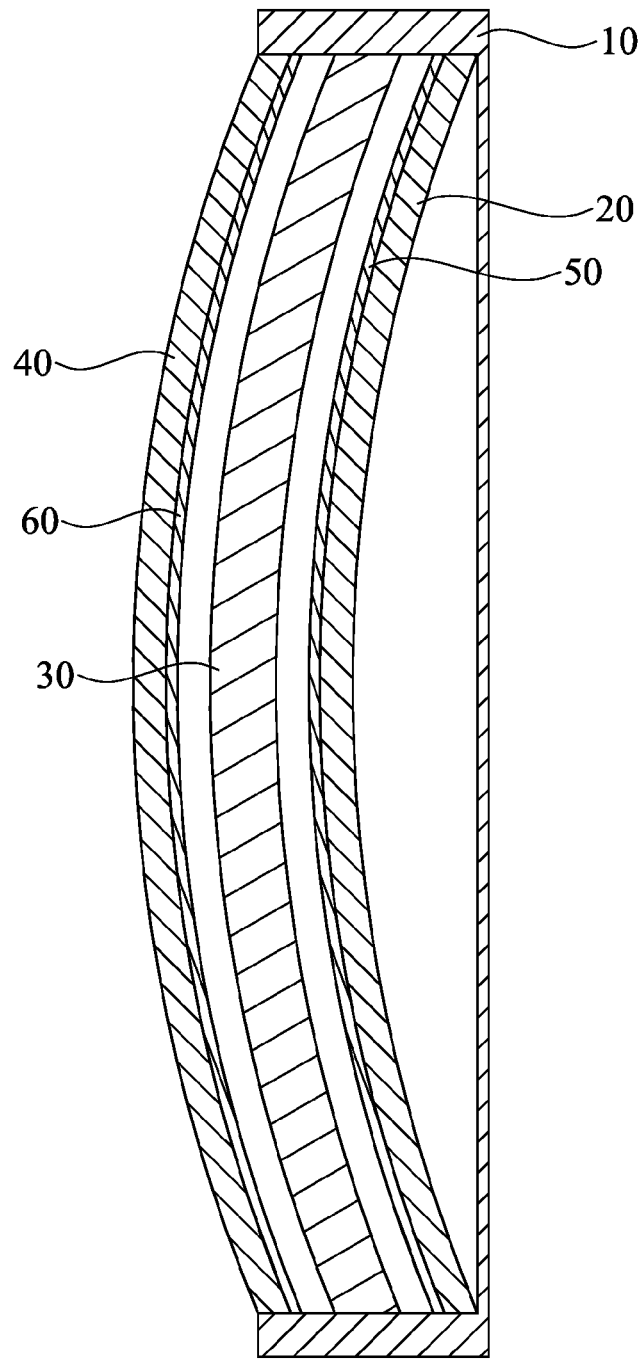
FIG. 3 is a cross-sectional diagram of a liquid crystal display with separated polarizer device of a second embodiment of the invention.

Furthermore, as shown in FIG. 3, when manufacturing a curved liquid crystal display 200, as the first polarizer device 50 and the second polarizer device 60 are separately deposited on the backlight module 20 and the transparent substrate 40 after bending, the first polarizer device 50 and the second polarizer device 60 do not affect the liquid crystal panel 30 regardless of the radius of curvature of the liquid crystal panel 30. Therefore, the liquid crystal panel 30 is prevented from being fractured when bent, so as to effectively increase process yield.

In summary, the liquid crystal display with separated polarizer device of the present invention facilitates reworking so as to increase reworking efficiency by the above separated arrangement; in addition, the glass in the liquid crystal panel is effectively prevented from being fractured when bent so as to increase process yield.

While the invention has been described by way of example and in terms of the preferred embodiments in above, those skilled in the art should understand that the embodiments only illustrate the invention and are not to be interpreted as limiting the scope of the invention. It should be noted that, the scope of the invention is intended to cover all modifications and replacements equivalent to the embodiments. Therefore, the scope of the invention should be defined by the scope of the appended claims.

What is claimed is:

1. A liquid crystal display with separated polarizer device, comprising:
    a frame;
    a backlight module, deposited in the frame;
    a liquid crystal panel, deposited in the frame and separated from the backlight module;
    a transparent substrate, deposited in the frame and separated from the liquid crystal panel;
    a first polarizer device, deposited on a surface of the backlight module facing the liquid crystal panel; and
    a second polarizer device, deposited on a surface of the transparent substrate facing the liquid crystal panel.

2. The liquid crystal display of claim 1, wherein the material of the transparent substrate is glass or polymethylmethacrylate (PMMA).

3. The liquid crystal display of claim 2, wherein the backlight module, the liquid crystal panel, the transparent substrate, the first polarizer device, and the second polarizer device are curved.

4. The liquid crystal display of claim 1, wherein the backlight module, the liquid crystal panel, the transparent substrate, the first polarizer device, and the second polarizer device are curved.

5. The liquid crystal display of claim 1, wherein the distance between the liquid crystal panel and the backlight module is between 0.1 mm and 50 mm.

6. The liquid crystal display of claim 5, wherein the distance between the liquid crystal panel and the transparent substrate is between 0.1 mm and 50 mm.

7. The liquid crystal display of claim 6, wherein the distance between the liquid crystal panel and the transparent substrate is between 0.1 mm and 10 mm.

8. The liquid crystal display of claim 5, wherein the distance between the liquid crystal panel and the backlight module is between 0.1 mm and 10 mm.

9. The liquid crystal display of claim 8, wherein the distance between the liquid crystal panel and the transparent substrate is between 0.1 mm and 10 mm.

* * * * *